(12) United States Patent
Kano (10) Patent No.: US 7,809,331 B2
(45) Date of Patent: Oct. 5, 2010

(54) DATA COMMUNICATION APPARATUS (75) Inventor: Hidekazu Kano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 11/719,598

(22) PCT Filed: Nov. 18, 2005

(86) PCT No.: PCT/JP2005/021267

§ 371 (c)(1),
(2), (4) Date: May 17, 2007

(87) PCT Pub. No.: WO2006/054706

PCT Pub. Date: May 26, 2006

(65) Prior Publication Data

US 2009/0149212 A1    Jun. 11, 2009

(30) Foreign Application Priority Data

Nov. 19, 2004   (JP)   ............... 2004-335518
Nov. 19, 2004   (JP)   ............... 2004-335519
Nov. 19, 2004   (JP)   ............... 2004-336083

(51) Int. Cl.
*H04B 5/00*     (2006.01)
*H04K 3/00*     (2006.01)

(52) U.S. Cl. ............... 455/41.1; 455/100; 343/718; 381/151

(58) Field of Classification Search ....... 455/41.1–41.2, 455/100; 340/573.1; 343/718; 381/151; 607/150

See application file for complete search history.

(56) References Cited

U.S. PATENT DOCUMENTS

2004/0196257 A1 * 10/2004 Sato et al. ............... 345/156

FOREIGN PATENT DOCUMENTS

| JP | 2001-308803 | 11/2001 |
| JP | 2002-246987 | 8/2002 |
| JP | 2003-134009 | 5/2003 |
| JP | 2004-064435 | 2/2004 |
| JP | 2004-128606 | 4/2004 |

OTHER PUBLICATIONS

International Search Report (PCT/JP2005/021267) dated Jan. 31, 2006.

* cited by examiner

*Primary Examiner*—Lee Nguyen
(74) *Attorney, Agent, or Firm*—Pearne & Gordon LLP

(57) ABSTRACT

To provide a data communication device capable of performing a stable human body communication by bringing the human body into contact with electrodes or proximities thereof without requiring user's attention when the data communication device held by the user is in the process of the human body communication. A transceiver electrode 103 and a reference electrode 104 are formed on concave portions 102 formed at positions where the user's fingers can be naturally brought into contact with the concave portions 102 when a data communication device 10 is held by one of the user's hands, such that the surfaces of the electrodes have a height slightly lower than those of the lateral portions of the housing 101. The transceiver electrode 103 and the reference electrode 104 are electrically connected, via a lead line 106, to a data communication unit 105 accommodated in the housing 101 and having a function of transmitting and receiving data. By bringing a communication party holding the data communication device 10 into contact with a human body and thus forming a closed circuit, data can be transmitted or received to and from the data communication unit 105 via the human body.

8 Claims, 10 Drawing Sheets

FIG. 1

USER A     USER B

DATA COMMUNICATION APPARATUS

TECHNICAL FIELD

The present invention relates to a communication device that transmits or receives data to and from a communication party via a human body being in contact with the communication party.

BACKGROUND ART

Recently, human body communication has been suggested in which data communication using a human body as an interface is performed between a data communication device held by a user and a data communication device in communication with the user's data communication device. In such a data communication device employing the human body communication, the human body being a conductor is used as an antenna. The data communication device generally includes a plurality of electrodes exposed to the outside to make contact with a portion of the human body and a data communication unit for data transmission or reception.

In the data communication device based on the human body communication, it is required to secure sufficient contact between the electrodes and the human body. For that reason, there has been suggested a structure in which the electrodes are formed on the rear surface of a wrist watch or on the inner surface of a ring so that the electrodes are naturally brought into contact with the human body in a secure manner in the case where the data communication device is held by or equipped on the user.

For example, there is disclosed a data communication device, in which a data communication unit is incorporated into a wrist watch type package, and electrodes are arranged in the width direction of a band part of the wrist watch so as to be opposed to each other, thereby enabling users to make the most of the data communication device without needing to pay attention to the electrode arrangement (see Patent Document 1 for reference).

In addition, there is disclosed a data communication device, in which an electrode surface is formed on the entire inner surface of a band part, and a plurality of protrusions are formed in the longitudinal direction of the electrode surface, thereby making it easy to bring the electrode surface into contact with the human body and thus improving contact pressure therebetween (see Patent Document 2 for reference).

However, in the case where the human body communication is applied to a handheld information terminal such as a cellular phone or a PDA, if the user does not hold the handheld information terminal while paying attention to respective positions of the electrodes, signals from the handheld information terminal are not securely transmitted to the human body and thus making communication unstable, thereby disabling the communication.

Moreover, since it is likely that only protruding parts of the protrusions are brought into contact with the human body, it is difficult to secure a sufficient contact area between the electrode surface and the human body.

Patent Document 1: JP-A-2003-134009
Patent Document 2: JP-A-2004-064435

DISCLOSURE OF THE INVENTION

Problem that the Invention is to Solve

The invention has been made in view of the above-mentioned circumstances, and its object is to provide a data communication device capable of providing a secure contact between electrodes and a human body without requiring user's attention when the data communication device held by the user is in the process of a human body communication, thereby enabling a stable data communication.

Means for Solving the Problem

According to the invention, there is provided a data communication device characterized in that the data communication device includes at least two electrodes making contact with a human body and a data communication unit having at least one of a data transmitting function and a data receiving function, in which data is transmitted or received to and from a communication counterparty via the human body by bringing the human body into contact with the electrodes, and the surfaces of the electrodes are formed into a groove surface so that the surfaces of the electrodes have a height lower than that of a peripheral portion thereof.

With such a configuration, when the data communication device held by the user is in the process of a human body communication, the grooved portion having a height lower than that of the peripheral portion can be naturally held by the user. Therefore, a portion of the human body such as fingers can be brought into contact with the electrodes formed on the grooved portion in an easy and secure manner without requiring the user's attention, thereby enabling a stable data communication.

The data communication device in accordance with the invention may be configured in such a manner that the electrodes are formed on the surface of concave portions formed on lateral portions of the housing of the data communication device.

With such a configuration, when the data communication device held by the user is in the process of a human body communication, the concave portions formed on the lateral portions of the housing can be naturally held by the user. Therefore, a portion of the human body such as fingers can be brought into contact with the electrodes formed on the concave portions in an easy and secure manner without requiring the user's attention while taking advantage of increased contact area, thereby enabling a stable data communication.

The data communication device in accordance with the invention may be configured in such a manner that the electrodes are formed to have a wave-like uneven surface.

With such a configuration, when the data communication device is held by the user, the user's fingers can be naturally brought into contact with the electrodes while being fitted into the wave-like uneven surface of the electrode. Therefore, the data communication can be performed in a stable manner. In this case, by forming the wave-like uneven surface into a shape corresponding to the fingers' pitch, the contact area can be further increased.

The data communication device in accordance with the invention may be configured in such a manner that at least one of the electrodes is divided into a plurality of electrode fragments.

With such a configuration, the user's fingers holding the data communication device can be brought into contact with at least one electrode fragment. Therefore, the data communication can be performed in a stable manner.

The data communication device in accordance with the invention may be configured in such a manner that at the electrodes are formed on corners of the housing of the data communication device.

With such a configuration, since the corners of the housing of the data communication device is usually supported and held by the user at the time of handling the data communication device, the user's fingers can be brought into contact with the electrodes formed on the corners. Therefore, the data communication can be performed in a stable manner.

The data communication device in accordance with the invention may be configured in such a manner that the lateral portions of the housing of the data communication device are formed to have rounded corners and the electrodes are arranged along the rounded lateral portions of the housing.

With such a configuration, since the appropriately rounded lateral portions of the housing are surrounded and held by the user at the time of handling the data communication device, the user's fingers can be brought into contact with the electrodes formed on the lateral portions of the housing of the data communication device. Therefore, the data communication can be performed in a stable manner.

Preferably, the electrodes are formed to cover at least a portion of the corners of the housing of the data communication device.

With such a configuration, the user's fingers can be brought into contact with the electrodes formed on the corners. Therefore, the data communication can be performed in a more stable manner.

The data communication device in accordance with the invention may be configured as a cellular phone unit.

Advantage of the Invention

According to the invention, it is possible to provide a data communication device capable of providing a secure contact between electrodes and a human body without requiring user's attention when the data communication device held by the user is in the process of a human body communication, thereby enabling a stable data communication.

BRIEF DESCRIPTION OF THE DRAWINGS

FIGS. 2A and 2B are schematic diagrams showing an exemplary configuration of a data communication device in accordance with a first embodiment, in which FIG. 2A is a front view thereof and FIG. 2B is a side view thereof.

FIGS. 3A to 3C are schematic diagrams showing another exemplary configuration of a cellular phone in accordance with the first embodiment, in which FIG. 3A is a front view thereof, FIG. 3B is a side view thereof, and FIG. 3C is a rear view thereof.

FIGS. 5A to 5C are schematic diagrams showing another exemplary configuration of the data communication device in accordance with the first embodiment, in which FIG. 5A is a front view thereof, FIG. 5B is a side view thereof, and FIG. 5C is a rear view thereof.

FIGS. 10A to 10C are schematic diagrams showing another exemplary configuration of the cellular phone in accordance with the second embodiment, in which FIG. 10A is a front view thereof, FIG. 10B is a side view thereof, and FIG. 10C is a rear view thereof.

FIGS. 11A to 11C are schematic diagrams showing another exemplary configuration of the data communication device in accordance with the second embodiment, in which FIG. 11A is a front view thereof, FIG. 11B is a side view thereof, and FIG. 11C is a rear view thereof.

FIGS. 18A to 18C are schematic diagrams showing another exemplary configuration of the cellular phone in accordance with the third embodiment, in which FIG. 18A is a front view thereof, FIG. 18B is a side view thereof, and FIG. 18C is a rear view thereof.

REFERENCE NUMERALS 10, 11, 20, 40, 50: DATA COMMUNICATION DEVICE
101, 111, 201, 301, 401, 501: HOUSING
103, 113, 203, 303, 403, 503: TRANSCEIVER ELECTRODE
104, 114, 204, 304, 404, 504: REFERENCE ELECTRODE
105: DATA COMMUNICATION UNIT
30: CELLULAR PHONE
307: TRANSMISSION LINE
308: REFERENCE LINE

BEST MODE FOR CARRYING OUT THE INVENTION

Figure 1:
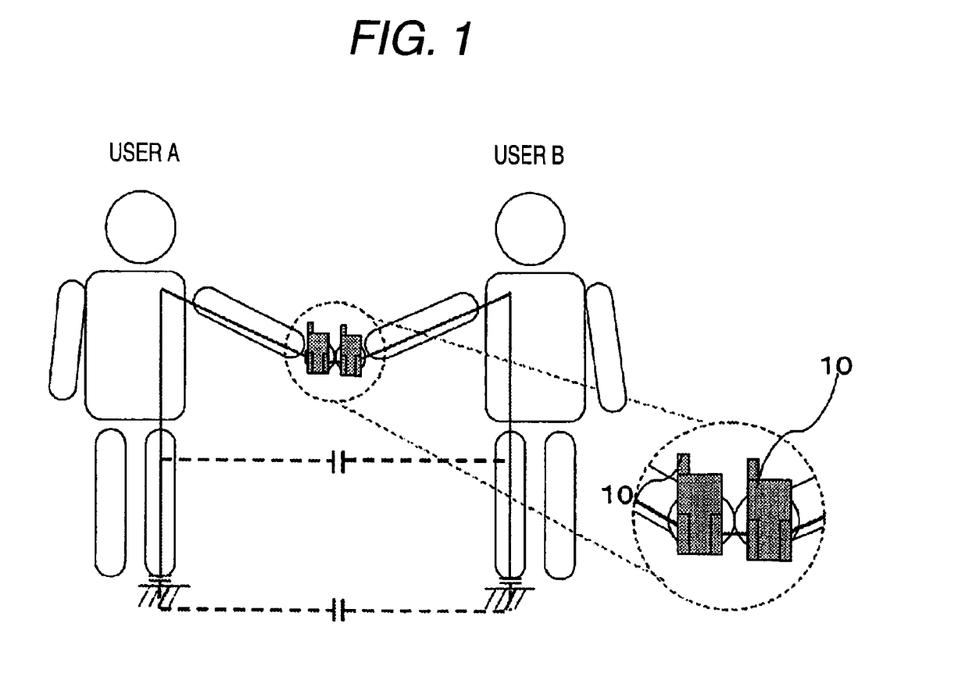
FIG. 1 is a schematic diagram showing an exemplary configuration of a data communication system employing a data communication device related to embodiments of the invention.

A data communication device in accordance with embodiments of the invention is characterized in that the surfaces of electrodes are formed into a groove surface so that the surfaces of the electrodes have a height lower than that of other portions of housing, and thus making it easy to hold the data communication device without requiring user's attention. In the invention, a cellular phone unit will be described as an example of a data communication device in which data is transmitted or received between two data communication devices held by respective users being in contact with each other via the users' body. FIG. 1 is a schematic diagram showing an exemplary configuration of a data communication system in which a human body communication is performed using a data communication device related to embodiments of the invention.

In FIG. 1, the data communication system is configured to have a data communication device 10 held by a user A and a data communication device 10 held by a user B. When the users A and B are brought into contact with each other via their hands by extending respective hands holding the respective data communication devices 10, a capacitive coupling between respective bodies of the users A and B forms a closed circuit. Thus, a bidirectional data communication can be performed between the data communication device 10 held by the user A and the data communication device 10 held by the user B.

In such a data communication system, for a stable human body communication, it is required that respective electrodes of the data communication devices 10 are securely brought into contact with the corresponding human bodies when the data communication devices 10 are held by the users A and B. Hereinafter, a data communication device having made to provide a secure contact between a human body and electrodes of the data communication device in accordance with the embodiments of the invention will be described with reference to drawings.

FIRST EMBODIMENT

Figure 2A:
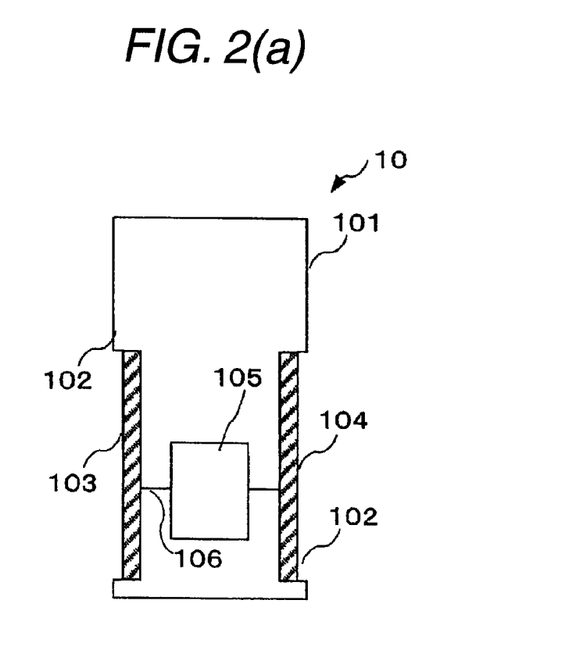
Figure 2B:
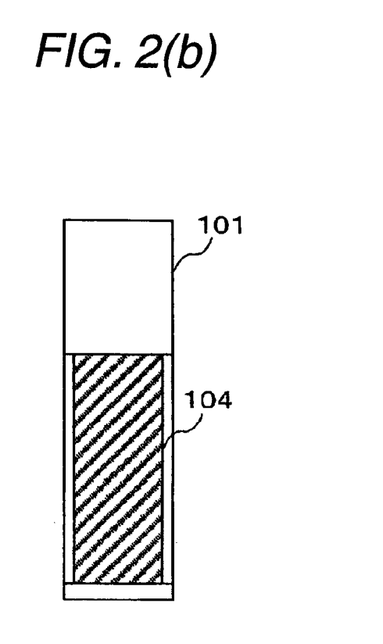

FIGS. 2A and 2B are schematic diagrams showing an exemplary configuration of a data communication device in accordance with a first embodiment of the invention, in which FIG. 2A is a front view thereof and FIG. 2B is a side view thereof. The first embodiment is characterized in that electrodes are formed on the surface of a concave formed on the lateral portion of the housing of the data communication device and the surfaces of the electrodes are formed into a groove surface so that the surfaces of the electrodes have a height lower than that of a peripheral portion thereof. As shown in the FIGS. 2A and 2B, the data communication device 10 is configured to have a transceiver electrode 103 and a reference electrode 104 formed respectively on the lateral portion of a housing 101 of the data communication device 10, a data communication unit 105 accommodated in the housing 101 and having a function of transmitting and receiving data, and a lead line 106 for electrically connecting the transceiver electrode 103 and the reference electrode 104 to the data communication unit 105.

The transceiver electrode 103 and the reference electrode 104 are made of a conductive material. Incidentally, the transceiver electrode 103 and the reference electrode 104 are formed on concave portions 102 formed at positions where the user's fingers can be naturally brought into contact with the concave portions 102 when the data communication device 10 is held by one of the user's hands, such that the surfaces of the electrodes have a height slightly lower than those of the lateral portions of the housing 101. With such a configuration, when the data communication device 10 is held by the user, the user's fingers can be brought into contact with the transceiver electrode 103 and the reference electrode 104, thereby maintaining a secure contact with the human body and thus enabling a stable human body communication.

The data communication unit 105 may include an oscillation unit for generating AC signals, a modem unit for modulating and demodulating the amplitude of transmission and reception data on the basis of the AC signals, a voltage application unit for applying modulated signals between the transceiver electrode 103 and the reference electrode 104 and transmitting data, a voltage detection unit for detecting a voltage applied between the transceiver electrode 103 and the reference electrode 104 and receiving data, and a transmission/reception mode switching unit for switching between a transmission mode and a reception mode.

Figure 3:
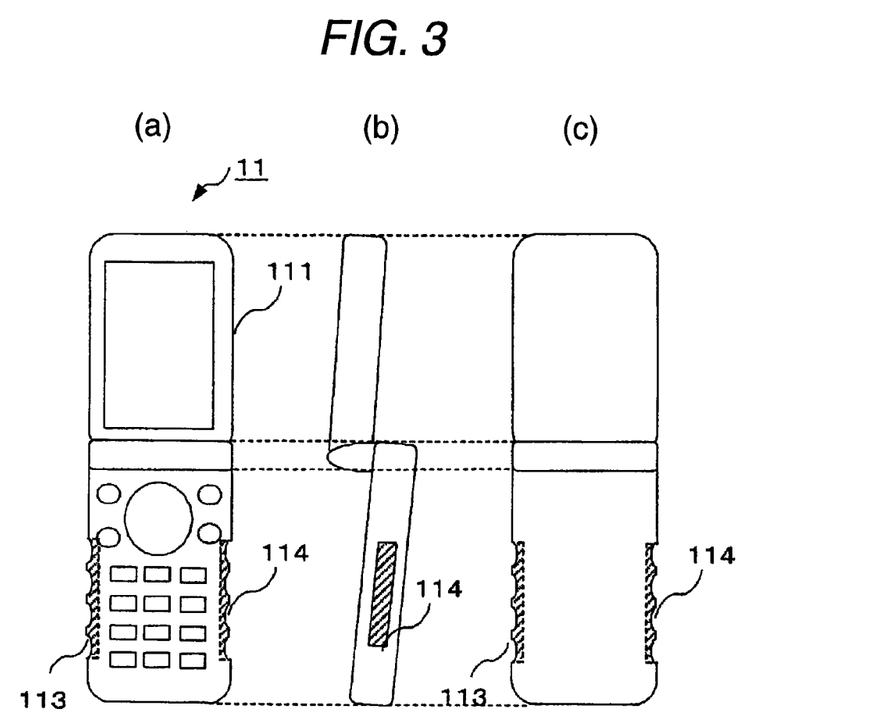

FIGS. 3A to 3C each shows an exemplary configuration of a folder-type cellular phone to which the data communication device related to the present embodiment is applied. In the configuration of the data communication device shown in FIGS. 3A to 3C, the transceiver electrode 113 and the reference electrode 114 are formed on the lateral portions of the housing 111 in a wave-like shape corresponding to the sectional shape of fingers. With such a configuration, when the data communication device 11 is held by one of the user's hands, the user's fingers can be naturally fitted into grooved portions of the transceiver electrode 113 and the reference electrode 114. Therefore, the contact with the human body can be maintained in a more secure manner.

Figure 4:
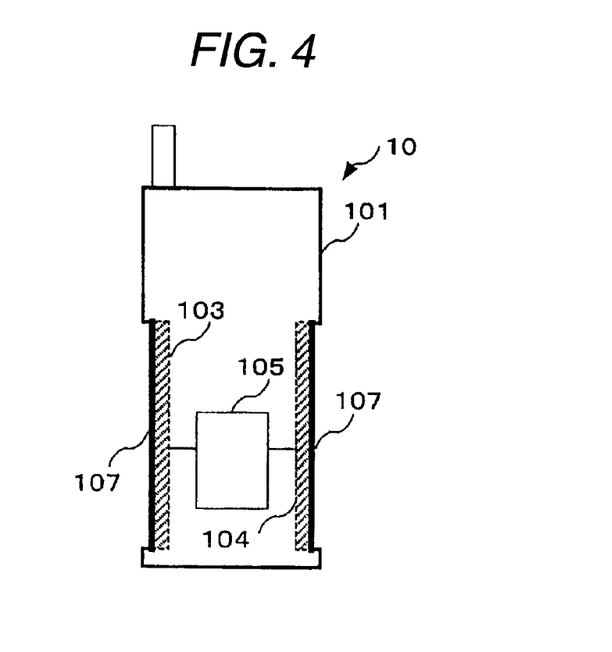
FIG. 4 is a schematic front view diagram showing another exemplary configuration of the data communication device in accordance with the first embodiment.

Incidentally, the housing 101 and 111 is made of an insulating material such as a resin similar to the case of a general handheld electronic apparatus. For that reason, the surfaces of the transceiver electrode 103 and the reference electrode 104 of the data communication device 10 shown in FIGS. 2A to 2C may be covered, for example, with a resin coating (insulating material) 107, as shown in FIG. 4. In the case where the surfaces of the electrodes are covered with the insulating material, if the electrodes 103 and 104 are not brought into close contact with the human body, the human body communication may become unstable. However, according to the configuration of the invention, since the electrodes are formed on the surfaces of the concaves formed on the lateral portions of the housing 101, the close-contactness between the electrodes and the human body can be improved. In this way, by configuring the data communication device 10 in such a manner as shown in FIGS. 3A to 3C that the transceiver electrode 113 and the reference electrode 114 are formed on the lateral portions of the housing 111 in a wave-like shape corresponding to the sectional shape of fingers, a high close-contactness can be advantageously provided between the human body and the electrodes without requiring the user's attention.

In this way, according to the data communication device related to the first embodiment of the invention, the transceiver electrode 103 and the reference electrode 104 being in contact with the human body and transmitting data are formed on the surface of the concaves formed on the lateral portions of the housing 101 of the data communication device 10. Therefore, when the data communication device 10 is held by the user, the electrodes 103 and 104 can be naturally brought into close contact with the user's fingers. Accordingly, the data communication based on the human body communication can be performed in a stable manner.

Incidentally, since the surfaces of the electrodes are formed into wave-like shapes, the user's fingers can be naturally fitted onto the electrodes. Therefore, it is possible to maintain a contact between the human body and the data communication device in a more secure manner. In addition, the occupying area of the electrodes on the surface of the housing can be reduced, and thus the data communication device can be made in a small size.

Next, a modified example of the first embodiment will be described.

Similar to those shown in FIGS. 3A to 3C, FIGS. 5A to 5C each shows an exemplary configuration of a folder-type cellular phone to which the data communication device related to the present embodiment is applied. In the configuration of the data communication device shown in FIGS. 5A to 5C, the transceiver electrode 113 and the reference electrode 114 are formed on the lateral portions of the housing 111 in a wave-like shape corresponding to the sectional shape of fingers. With such a configuration, when the data communication device 11 is held by one of the user's hands, the user's fingers can be naturally fitted into grooved portions of the transceiver electrode 113 and the reference electrode 114. Therefore, the contact with the human body can be maintained in a more secure manner.

Figure 5:
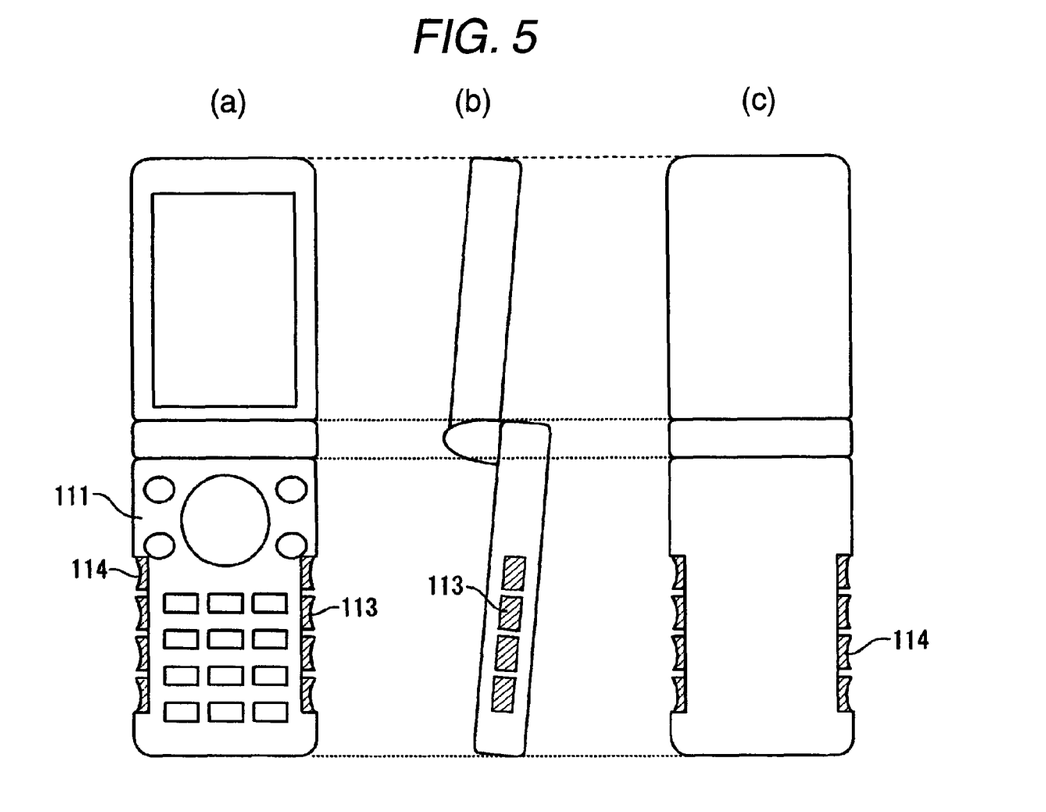

According to the data communication device having such a configuration, the transceiver electrode 113 and the reference electrode 114 being in contact with the human body and transmitting data are formed on the surface of the concaves formed on the lateral portions of the housing 111 of the data communication device 10. Therefore, when the data communication device 10 is held by the user, the electrodes 103 and 104 can be naturally brought into close contact with the user's fingers. Accordingly, the data communication based on the human body communication can be performed in a stable manner.

Incidentally, since the surfaces of the electrodes are formed into wave-like shapes, the user's fingers can be naturally fitted onto the electrodes. Therefore, it is possible to maintain a contact between the human body and the data communication device in a more secure manner. In addition, the occupying area of the electrodes on the surface of the housing can be reduced, and thus the data communication device can be made in a small size.

SECOND EMBODIMENT

Figure 6:
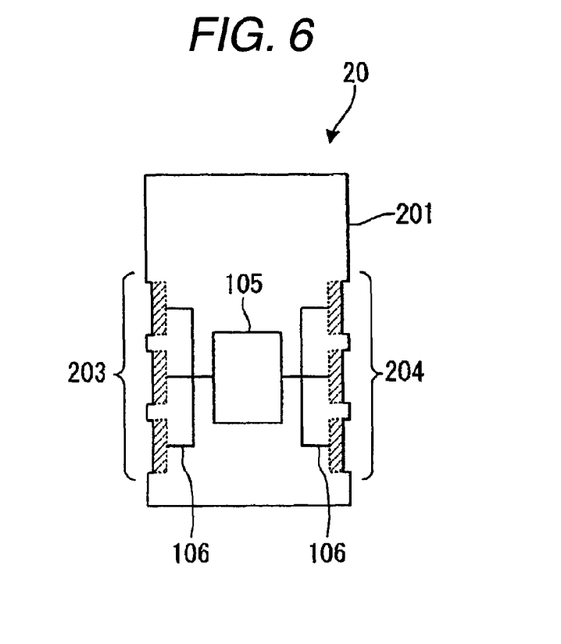
FIG. 6 is a schematic front view diagram showing an exemplary configuration of a data communication device in accordance with a second embodiment.

FIG. 6 is a schematic front view diagram showing an exemplary configuration of a data communication device in accordance with a second embodiment of the invention. The second embodiment is characterized in that a transceiver electrode 203 and a reference electrode 204 are divided into a plurality of electrode fragments. Incidentally, those elements corresponding to those described in relation to the first embodiment and shown in FIGS. 2A to 2C will be denoted by the same reference numerals.

In FIG. 6, the data communication device 20 is configured to have the transceiver electrode 203 and the reference electrode 204 which are divided into a plurality of electrode fragments and formed at positions on the lateral portions of a housing 201 where the user's fingers can be naturally brought into contact with the electrodes 203 and 204 when the data communication device 20 is held by one of the user's hands. The respective electrode fragments of the transceiver electrode 203 and the reference electrode 204 are electrically connected to each other and connected via the lead line 106 to the data communication unit 105 accommodated in the housing 201. Incidentally, the transceiver electrode 203 and the reference electrode 204 are formed on the surface of the concaves formed on the lateral portions of the housing 201.

When the data communication device 20 is held by one of the user's hands, the user's fingers can be brought into contact with at least one of the respective divided electrode fragments of the transceiver electrode 203 and the reference electrode 204. Therefore, the contact between the human body and the data communication device 20 can be securely maintained by the user's fingers, thereby enabling a stable communication.

Incidentally, in the present embodiment, the transceiver electrode 203 and the reference electrode 204 being in contact with the human body and transmitting data are formed on the surface of the concaves formed on the lateral portions of the housing 201 of the data communication device 20. Therefore, when the data communication device 20 is held by the user, the electrodes 203 and 204 can be naturally brought into close contact with the user's fingers. Accordingly, the data communication based on the human body communication can be performed in a stable manner.

Figure 7:
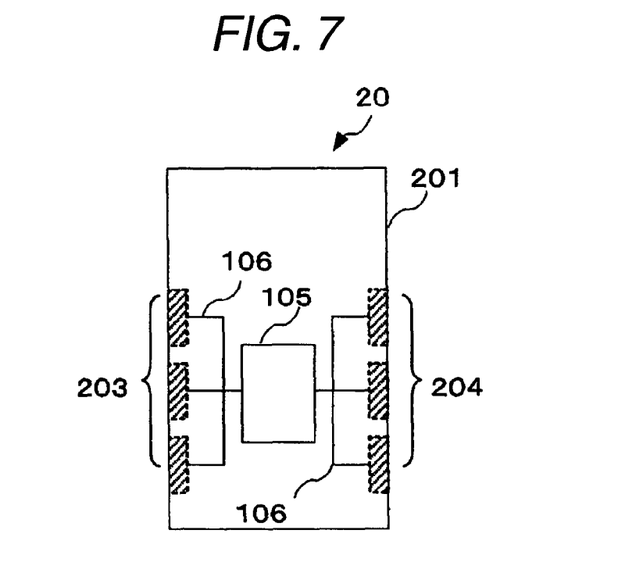
FIG. 7 is a schematic diagram showing another exemplary configuration of the data communication device in accordance with the second embodiment.

FIG. 7 is a schematic front view diagram showing an exemplary configuration of a data communication device in accordance with a modified example of the data communication device shown in FIG. 6. Incidentally, those elements corresponding to those described in relation to the first embodiment and shown in FIG. 6 will be denoted by the same reference numerals.

In FIG. 7, the data communication device 20 is configured to have the transceiver electrode 203 and the reference electrode 204 which are divided into a plurality of electrode fragments and formed at positions on the lateral portions of a housing 201 where the user's fingers can be naturally brought into contact with the electrodes 203 and 204 when the data communication device 20 is held by one of the user's hands. The modified example is different from the first embodiment in that the respective electrode fragments of the transceiver electrode 203 and the reference electrode 204 are formed on the same surface of the housing, and other configurations are the same as those of the data communication device of the first embodiment. That is, The respective electrode fragments of the transceiver electrode 203 and the reference electrode 204 are electrically connected to each other and connected via the lead line 106 to the data communication unit 105 accommodated in the housing 201.

In the present embodiment, when the data communication device 20 is held by one of the user's hands, the user's fingers can be brought into contact with at least one of the respective divided electrode fragments of the transceiver electrode 203 and the reference electrode 204. Therefore, the contact between the human body and the data communication device 20 can be securely maintained by the user's fingers, thereby enabling a stable communication.

Figure 8:
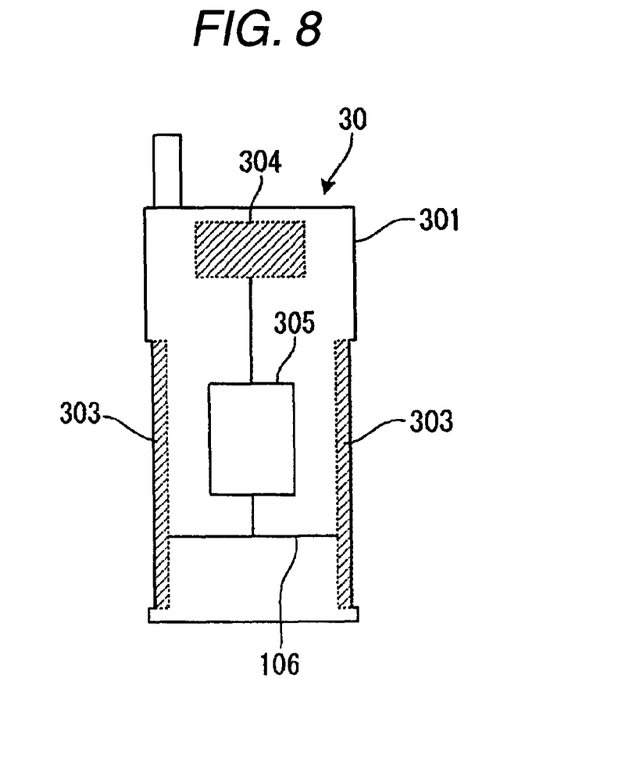
FIG. 8 is a schematic front view diagram showing an exemplary configuration of a cellular phone to which the data communication device related to the second embodiment is applied.

FIG. 8 is a schematic front view diagram showing an exemplary configuration of a cellular phone to which the data communication device in accordance with the present embodiment is applied. In FIG. 8, a cellular phone 30 is configured in such a manner that a transceiver electrode 303 divided into two parts is formed on the lower portions of the lateral portions of a housing 301 at positions where the user's fingers can be naturally brought into contact with the transceiver electrode 303 when the cellular phone 30 is held by one of the user's hands, and a reference electrode 304 is formed, for example, on the upper portion of the rear surface of the housing 301 so that the user does not touch the reference electrode. In this case, the transceiver electrode 303 is formed on the surfaces of the concaves formed on the lateral portions of the housing 301.

With such a configuration, when the cellular phone 30 is held by one of the user's hands, the user's fingers can be brought into contact with at least one of the two divided electrode fragments of the transceiver electrode 303. Therefore, the data communication can be performed in a stable manner.

Incidentally, the electrode arrangement in the cellular phone 30 is not limited to this, but the transceiver electrode 303 and the reference electrode 304 may be formed at positions where the cellular phone 30 can be held by one of the user's hands, in a similar manner to the case of the data communication device 20 shown in FIGS. 5A to 5C. In addition, the positional relationship shown in FIG. 8 between the transceiver electrode 303 and the reference electrode 304 may be changed in such an opposite manner that the transceiver electrode 303 is formed on the rear surface of the housing 301 while forming the reference electrode 304 on the lateral portions of the housing 301 so as to be divided into two parts.

Figure 9:
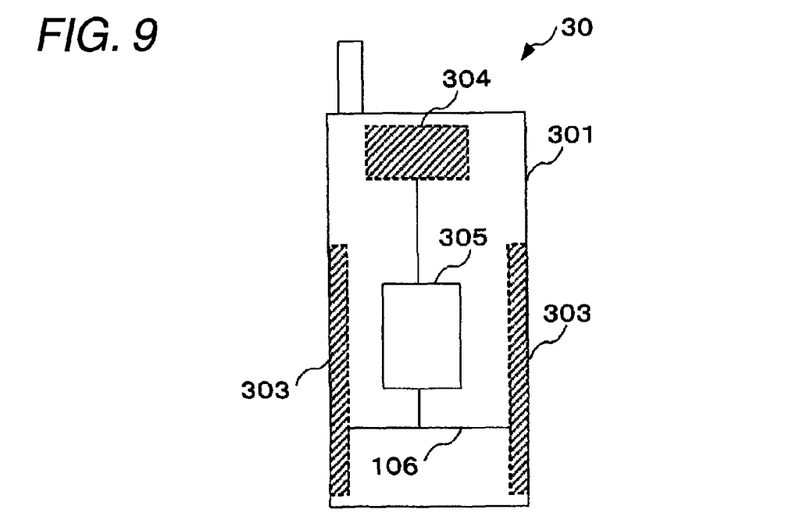
FIG. 9 is a schematic diagram showing another exemplary configuration of the data communication device in accordance with the second embodiment.

FIG. 9 is a schematic front view diagram showing an exemplary configuration of a cellular phone to which the data communication device in accordance with a modified example of the present embodiment is applied. The configuration shown in FIG. 9 is different from that shown in FIG. 8 in that respective electrode fragments of the transceiver electrode 203 and the reference electrode 204 are formed on the same surface as the surface of the housing, and other configurations are the same as those of shown in FIG. 8. In FIG. 9, a cellular phone 30 is configured in such a manner that a transceiver electrode 303 divided into two parts is formed on the lower portions of the lateral portions of a housing 301 at positions where the user's fingers can be naturally brought into contact with the transceiver electrode 303 when the cellular phone 30 is held by one of the user's hands, and a reference electrode 304 is formed, for example, on the upper portion of the rear surface of the housing 301 so that the user does not touch the reference electrode.

With such a configuration, when the cellular phone 30 is held by one of the user's hands, the user's fingers can be brought into contact with at least one of the two divided electrode fragments of the transceiver electrode 303. Therefore, the data communication can be performed in a stable manner.

Figure 10:
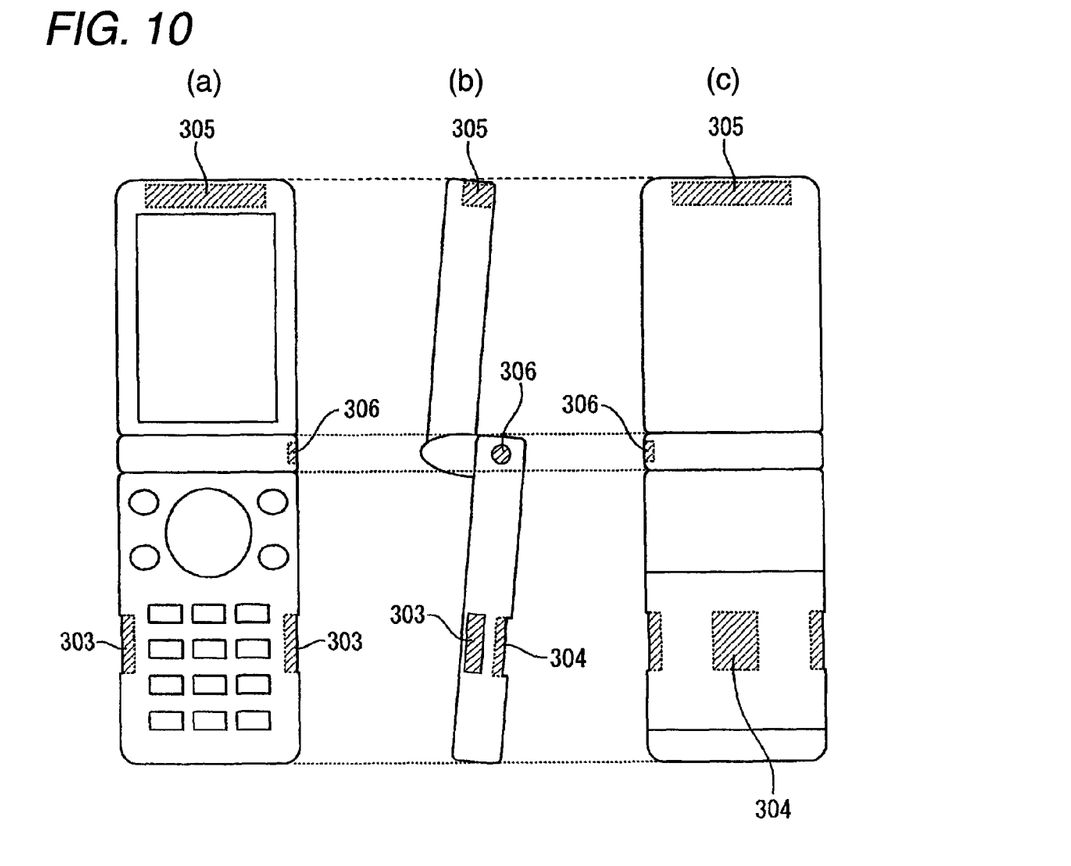

FIGS. 10A to 10C are schematic diagrams showing an exemplary configuration of a cellular phone to which the data communication device in accordance with the present embodiment is applied, in which FIG. 10A is a front view thereof, FIG. 10B is a side view thereof, and FIG. 10C is a rear view thereof. As shown in FIGS. 10A to 10C, the transceiver electrode 303 divided into two parts is formed on the lateral portions of the housing 301 at positions where the user's fingers can be naturally brought into contact with the transceiver electrode 303 when the cellular phone is held by one of the user's hands, and the reference electrode 304 is formed on the lower portion of the rear surface of the housing 301. As described above, the reference electrode 305 may be formed, for example, on the upper portion of the rear surface of the housing 301 so that the user does not touch the reference electrode 305. In this case, the transceiver electrode 303 and the reference electrode 304 are formed on the surfaces of the concaves formed on the lateral portions of the housing 301.

In this way, by forming the electrodes on three different locations on the cellular phone 30, the user's body can be brought into contact with substantially the entire electrodes in a secure manner when the cellular phone 30 is held by one of the user's hands.

Incidentally, by forming an electrode 306 on a hinge portion of the folder-type cellular phone or configuring at least one of operation keys to act as an electrode, the unpleasant appearance of the data communication device can be eliminated. To allow using the data communication device in the unfolded housing state, a portion of the electrode fragments may be formed on the top surface of the housing.

Figure 11:
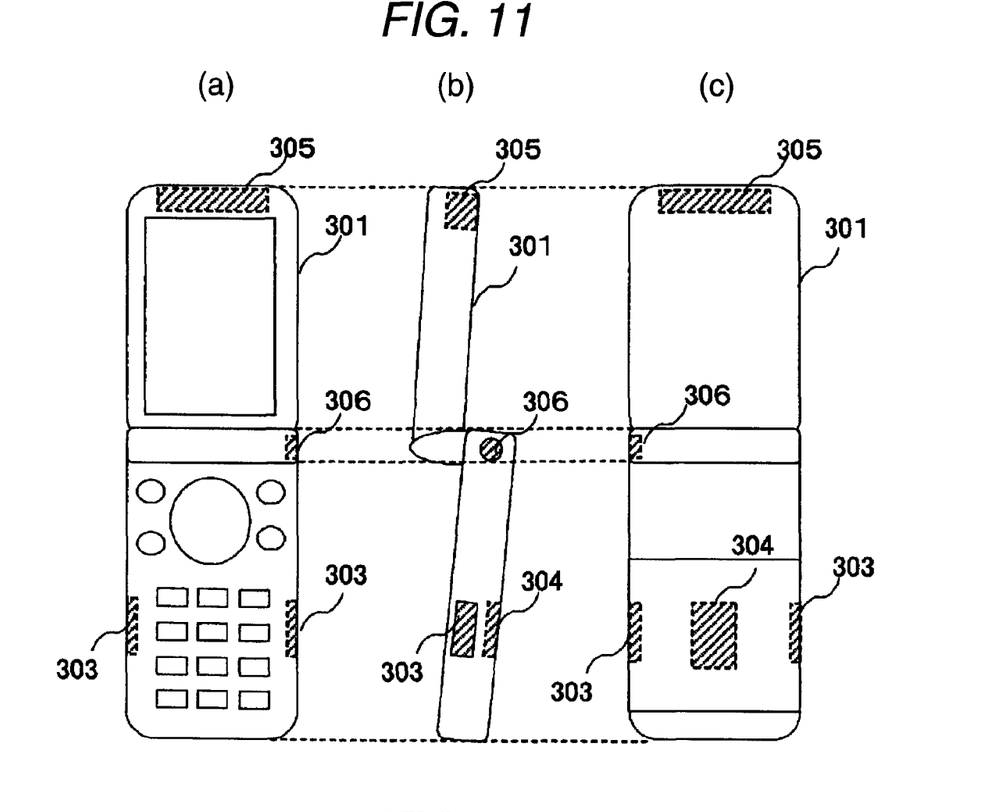

FIGS. 11A to 11C are schematic diagrams showing an exemplary configuration of a cellular phone to which the data communication device in accordance with the present embodiment is applied, in which FIG. 11A is a front view thereof, FIG. 11B is a side view thereof, and FIG. 11C is a rear view thereof. The configuration shown in FIGS. 11A to 11C is different from that shown in FIGS. 10A to 10C in that respective electrode fragments of the transceiver electrode 303 and the reference electrode 304 are formed on the same surface as the surface of the housing, and other configurations are the same as those of shown in FIGS. 10A to 10C. As shown in FIGS. 11A to 11C, the transceiver electrode 303 divided into two parts is formed on the lateral portions of the housing 301 at positions where the user's fingers can be naturally brought into contact with the transceiver electrode 303 when the cellular phone is held by one of the user's hands, and the reference electrode 304 is formed on the lower portion of the rear surface of the housing 301. As described above, the reference electrode 305 may be formed, for example, on the upper portion of the rear surface of the housing 301 so that the user does not touch the reference electrode 305. In this way, by forming the electrodes on three different locations on the cellular phone 30, the user's body can be brought into contact with substantially the entire electrodes in a secure manner when the cellular phone 30 is held by one of the user's hands.

Incidentally, by forming an electrode 306 on a hinge portion of the folder-type cellular phone or configuring at least one of operation keys to act as an electrode, the unpleasant appearance of the data communication device can be eliminated. To allow using the data communication device in the unfolded housing state, a portion of the electrode fragments may be formed on the top surface of the housing.

Figure 12:
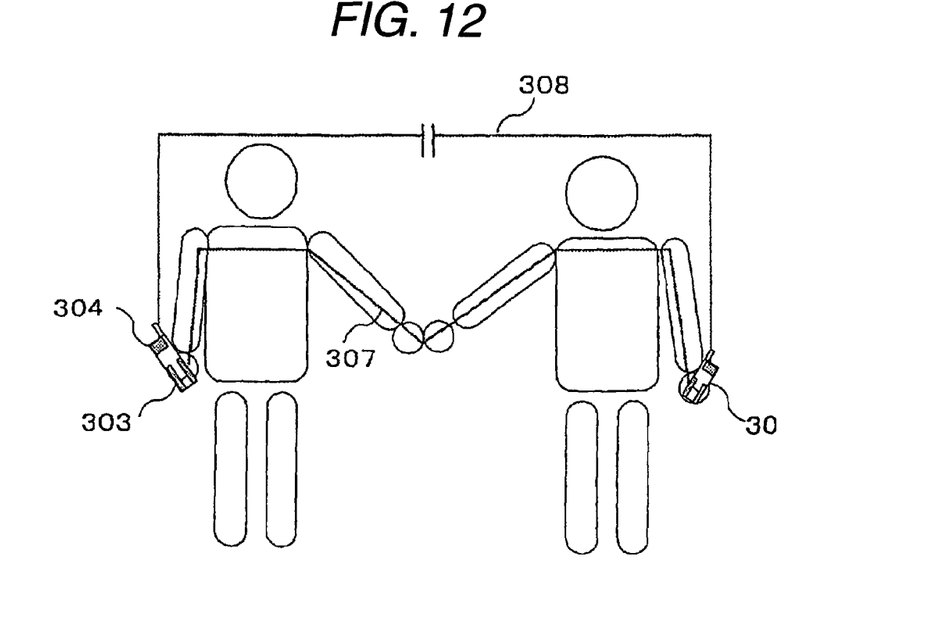
FIG. 12 is a schematic diagram showing an exemplary configuration of a data communication system employing the cellular phone related to the second embodiment.

Next, an example of a human body communication using the cellular phone 30 in accordance with the present embodiment will be described. FIG. 12 is a schematic diagram showing an exemplary configuration of a data communication system in which a data communication is performed between respective cellular phones 30 held by users A and B.

In FIG. 12, the users A and B are holding the respective cellular phones 30 in each other's hand while being in contact with the transceiver electrode 303 divided into parts and formed on the lower portions of the lateral portions of the housing 301. When the other hands of the users A and B other than the hands holding their cellular phones 30 are brought into contact with each other, the bodies of the users A and B connected via their hands being in contact with each other act as a transmission line 307 in the data communication, and an electrostatic coupling between the reference electrodes 304 being in non-contact with the users' hands forms a reference line 308. In this way, a closed circuit is formed between two cellular phones 30 via the human body, thereby enabling a bidirectional data communication between the cellular phones.

In the data communication device 20 related to the second embodiment of the invention, the transceiver electrode 203 and the reference electrode 204 being in contact with the human body and transmitting data are divided into a plurality of electrode fragments and formed on the lateral portions of the housing 201. With such a configuration, when the data communication device is held by the user, since the user's fingers are brought into contact with at least one of the divided electrode fragments of the transceiver electrode 203 and the reference electrode 204, the contact with the human body can be securely maintained and thereby enabling a stable data communication.

Incidentally, in the cellular phone 30 to which the data communication device in accordance with the present embodiment is applied, the transceiver electrode 303 is divided into two parts and formed on the lower portion of the lateral portions of the housing 301, and the reference electrode 304 is formed on the lower portion of the rear surface of the housing 301. In a similar to the case of the data communication device 10 shown in FIG. 1, when the cellular phones 30 having such a configuration are held in two users' respective hands while bringing the other hands of the users into contact with each other, a data communication based on the human body communication can be performed between the cellular phones 30 in a stable manner.

THIRD EMBODIMENT

Figure 13:
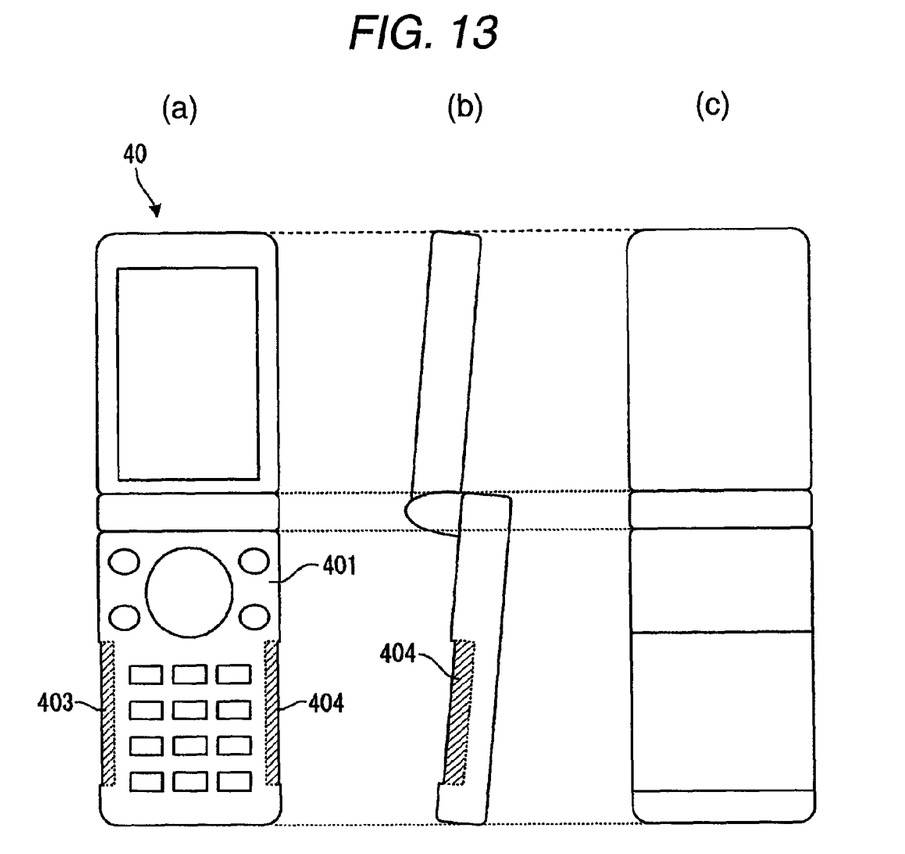
FIG. 13 is a schematic front view diagram showing an exemplary arrangement of electrodes in a data communication device in accordance with a third embodiment.

FIGS. 13A to 13C are schematic diagrams showing an exemplary configuration of a cellular phone to which a data communication device related to a third embodiment of the invention is applied, in which FIG. 13A is a front view thereof, FIG. 13B is a side view thereof, and FIG. 13C is a rear view thereof. In the present embodiment, electrodes are formed on the corners of the housing of the data communication device, and the user's fingers can be brought into contact with the electrodes formed on the corners in a secure manner. Accordingly, a data communication can be performed in a stable manner. Incidentally, basic components are the same as those of in the first and second embodiments, and thus descriptions thereof will be omitted.

In FIGS. 13A to 13C, the data communication device 40 is configured to have a transceiver electrode 403 and a reference electrode 404 which are formed on corners 402 of the lateral portions of the housing 401 so that the user's fingers are naturally brought into contact with the corners 402 when the user is supporting the housing 401 to operate the data communication device 40 with one of the user's hands. In this case, the transceiver electrode 403 and the reference electrode 404 are formed on the surfaces of the concaves formed on the lateral portions of the housing 401.

When the data communication device 40 is held by one of the user's hands, the user's fingers can be brought into contact with the transceiver electrode 403 and the reference electrode 404. Therefore, the contact between the human body and the data communication device 40 can be securely maintained by the user's fingers, thereby enabling a stable communication.

Figure 14:
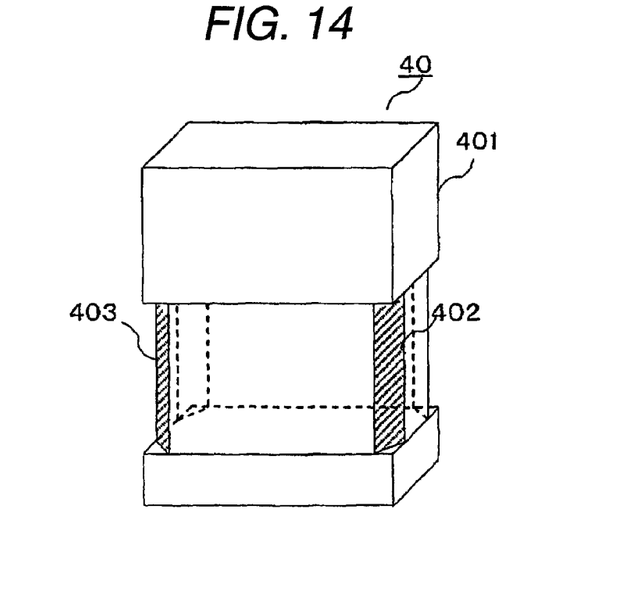
FIG. 14 is a schematic front view diagram showing an exemplary arrangement of electrodes in a data communication device in accordance with a third embodiment.
Figure 15:
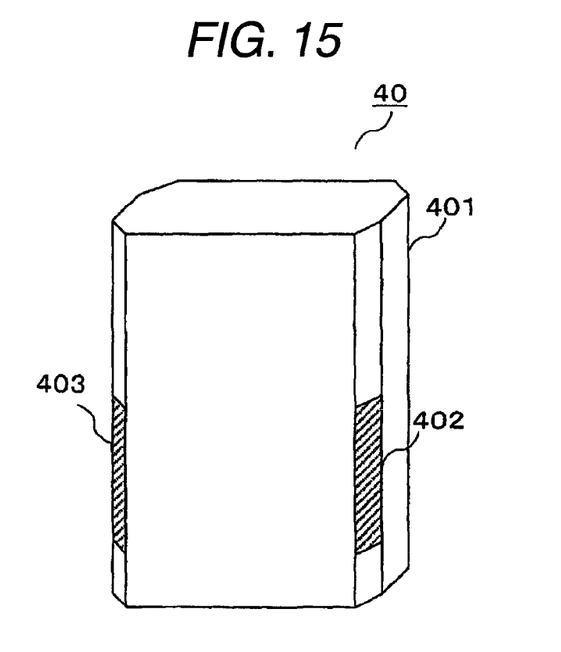
FIG. 15 is a schematic front view diagram showing an exemplary arrangement of the electrodes in the data communication device in accordance with the third embodiment.

Incidentally, as shown in FIGS. 14 and 15, a portion or the entire portions of the corners of the lateral surface of the housing of the data communication device 40 may be obliquely cut away to form a concave 402 in the corners so that the transceiver electrode 403 and the reference electrode 404 are formed on the surface of the concave 402.

Figure 16:
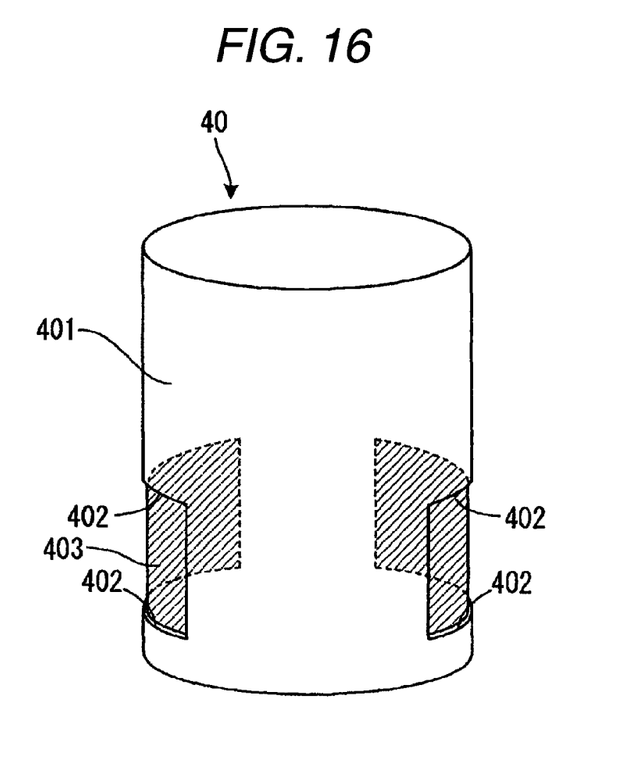
FIG. 16 is a schematic front view diagram showing an exemplary arrangement of the electrodes in the data communication device in accordance with the third embodiment.

Alternatively, as shown in FIG. 16, the corners of the lateral surface of the housing of the data communication device 40 may be rounded while forming a concave 402 in the corners so that the transceiver electrode 403 and the reference electrode 404 are formed on the surface of the concave 402. The curvature of the corners may be designed to have a sufficiently small gap between the user's fingers and the data communication device 40 when the user is supporting the data communication device 40.

With such a configuration, when the data communication device 40 is held by one of the user's hands, the user's fingers can be brought into contact with the transceiver electrode 403 and the reference electrode 404. Therefore, the contact between the human body and the data communication device 40 can be securely maintained by the user's fingers, thereby enabling a stable communication.

Figure 17:
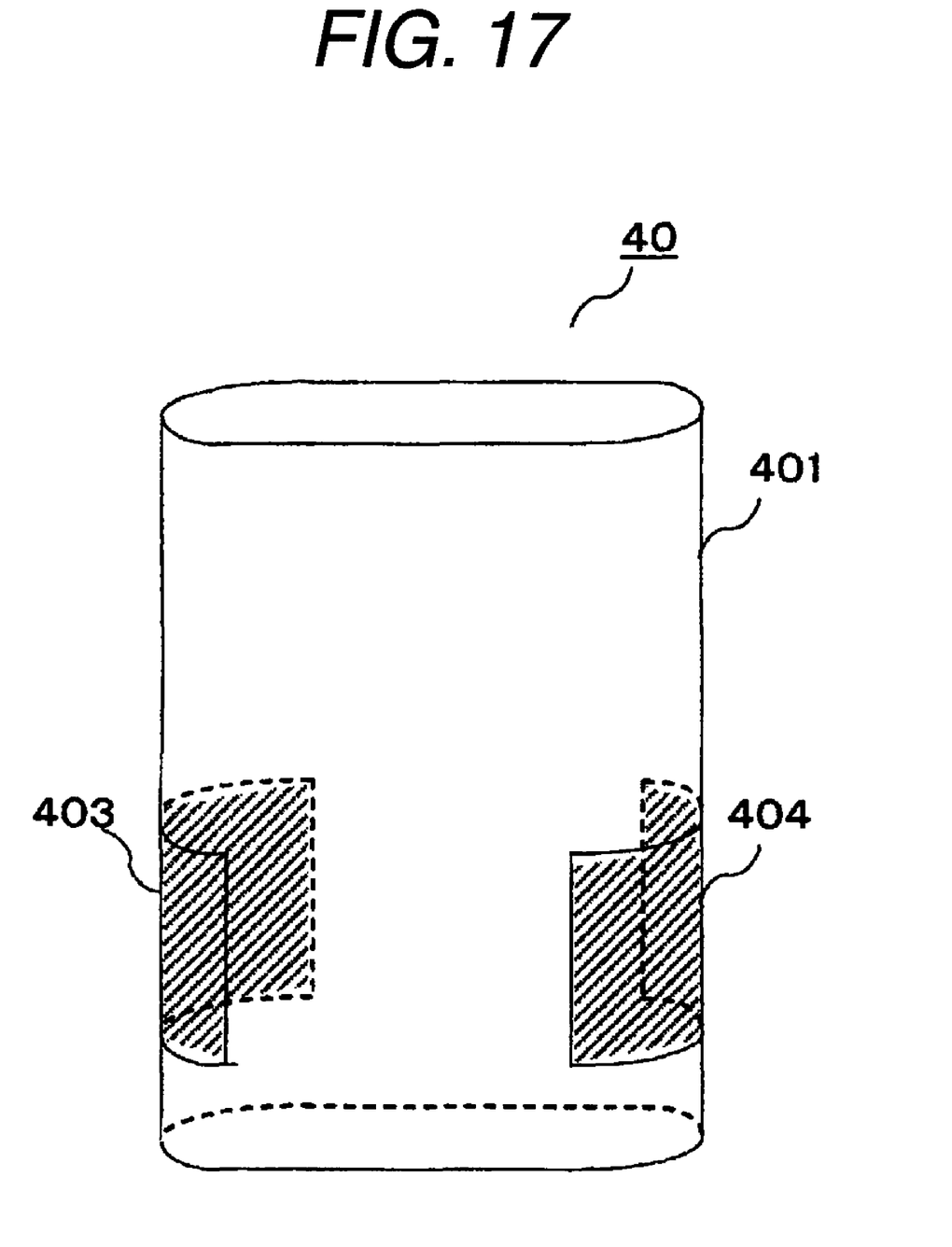
FIG. 17 is a schematic front view diagram showing another exemplary arrangement of the electrodes in the data communication device in accordance with the third embodiment.

FIG. 17 shows a modified example of the data communication device shown in FIG. 16. The configuration shown in FIG. 17 is different from that shown in FIG. 16 in that respective electrode fragments of the transceiver electrode 403 and the reference electrode 404 are formed on the same surface as the surface of the housing, and other configurations are the same as those of shown in FIG. 16. That is, the corners of the lateral surface of the housing of the data communication device 40 may be rounded so that the transceiver electrode 403 and the reference electrode 404 are formed on the surface of the concave 402. The curvature of the corners may be designed to have an appropriate gap between the user's fingers and the data communication device 40 when the user is supporting the data communication device 40.

With such a configuration, when the data communication device 40 is held by one of the user's hands, the user's fingers can be brought into contact with the transceiver electrode 403 and the reference electrode 404. Therefore, the contact between the human body and the data communication device 40 can be securely maintained by the user's fingers, thereby enabling a stable communication.

Figure 18:
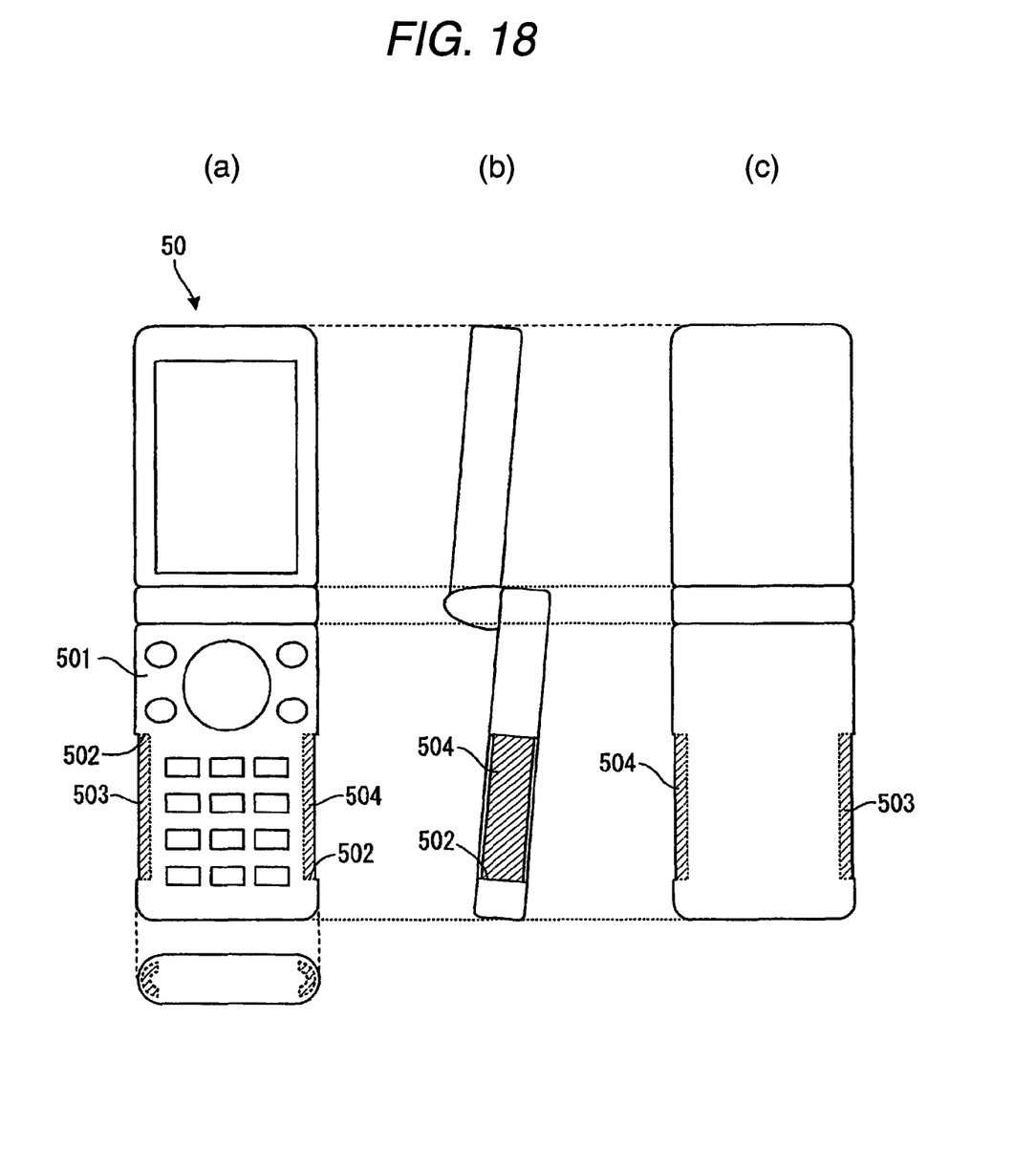

FIGS. 18A to 18C are schematic diagrams showing an exemplary configuration of a folder-type cellular phone to which the data communication device in accordance with the third embodiment of the invention is applied, in which FIG. 18A is a front view thereof, FIG. 18B is a side view thereof, and FIG. 18C is a rear view thereof.

In FIGS. 18A to 18C, the data communication device 50 is configured in such a manner that corners 502 on the lateral portions of the housing 501 of the data communication device 50 is rounded to have a curvature designed to have a sufficiently small gap between the user's fingers and the data communication device 50 when the user is supporting the data communication device 50 so that the user's fingers are naturally brought into contact with the corners 502 when the user is supporting the housing 501 to operate the data communication device 50 with one of the user's hands, thereby forming a transceiver electrode 503 and a reference electrode 504 on the rounded surface of corners 502.

Even when the data communication device 50 is held by one of the user's hands, the user's fingers can be brought into contact with the transceiver electrode 503 and the reference electrode 504. Therefore, the contact between the human body and the data communication device 50 can be securely maintained by the user's fingers, thereby enabling a stable communication.

With such a configuration, when the data communication device 50 is held by one of the user's hands, the user's fingers can be brought into contact with the transceiver electrode 503 and the reference electrode 504. Therefore, the contact between the human body and the data communication device 50 can be securely maintained by the user's fingers, thereby enabling a stable communication.

Although the above-described embodiments have been described with reference to a case in which the data communication device is applied to the cellular phone, the invention is not limited to this. The invention may be applied to a handheld music player or a handheld terminal unit such as a PDA.

INDUSTRIAL APPLICABILITY

The invention is advantageous in that it provides a data communication device capable of providing a secure contact between electrodes and a human body without requiring user's attention when the data communication device held by the user is in the process of a human body communication, thereby enabling stable data communication. Therefore, the invention can be advantageously applied to a handheld terminal unit such as a cellular phone for data communication.

The invention claimed is:

1. A data communication device including at least two electrodes making contact with a human body and a data communication unit having at least one of a data transmitting function and a data receiving function, in which data is transmitted or received to and from a communication counterparty via the human body by bringing the human body into contact with the electrodes or proximities thereof, wherein a laterally-exposed surface of at least one of the electrodes is recessed laterally inward into a groove formed in a lateral side of a housing of the data communication device so that the laterally-exposed surface of the at least one of the electrodes extends outward in a lateral direction to a lesser extent than a peripheral portion of a housing of the data communication device; and wherein the data communication device is a handheld communication terminal.

2. The data communication device according to claim 1, wherein at least one of the electrodes is formed on the surface of concave portions formed on lateral portions of the housing of the data communication device.

3. The data communication device according to claim 1, wherein at least one of the electrodes is formed to have a wave-like uneven surface.

4. The data communication device according to claim 1, wherein at least one of the electrodes is divided into a plurality of electrode fragments.

5. The data communication device according to claim 1, wherein at least one of the electrodes is formed on corners of the housing of the data communication device.

6. The data communication device according to claim 5, wherein the electrodes are formed on rounded lateral portions of the housing.

7. The data communication device according to claim 1, wherein the data communication device is a cellular phone unit.

8. The data communication device according to claim 1, wherein at least one of the electrodes is formed on the surface of concave portions formed on a first lateral portion of the housing of the data communication device and at least another electrode is formed on the surface of concave portions formed on a second lateral portion of the housing of the data communication device.

* * * * *